No. 619,175. Patented Feb. 7, 1899.
F. J. HEDA.
ANIMAL TRAP.
(Application filed June 22, 1898.)
(No Model.)
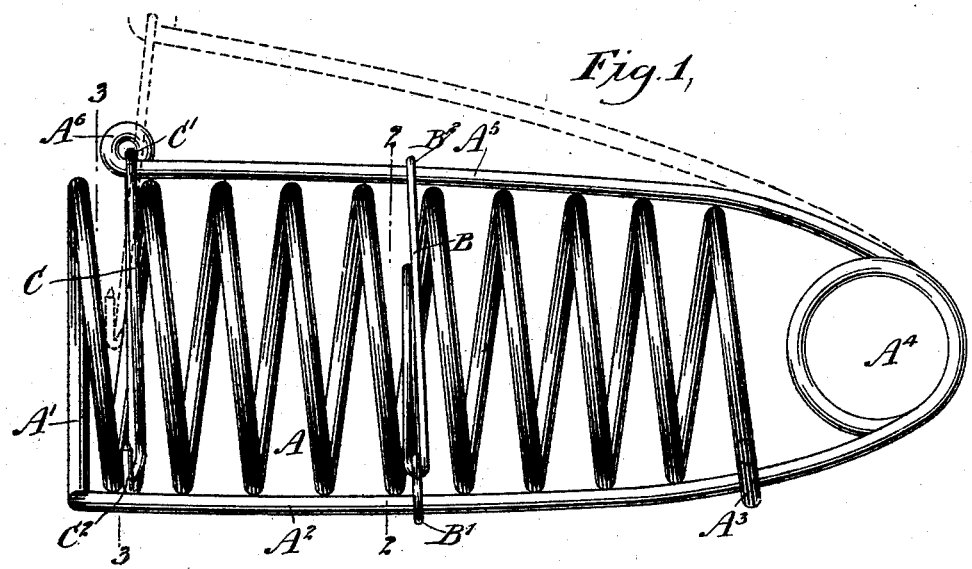
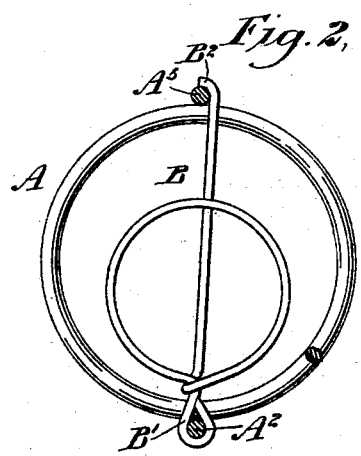
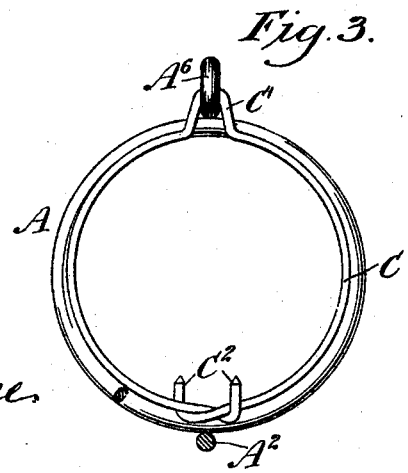
WITNESSES:
Edward Thorpe
INVENTOR
F. J. Heda
BY
ATTORNEYS.

UNITED STATES PATENT OFFICE.

FRANK J. HEDA, OF TECUMSEH, NEBRASKA.

ANIMAL-TRAP.

SPECIFICATION forming part of Letters Patent No. 619,175, dated February 7, 1899.

Application filed June 22, 1898. Serial No. 684,147. (No model.)

*To all whom it may concern:*

Be it known that I, FRANK J. HEDA, of Tecumseh, in the county of Johnson and State of Nebraska, have invented a new and Improved Animal-Trap, of which the following is a full, clear, and exact description.

The object of the invention is to provide a new and improved animal-trap which is simple and durable in construction, very effective in operation, and particularly designed for catching rats, squirrels, gophers, and other animals burrowing in the ground.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a transverse section of the same on the line 2 2 in Fig. 1, and Fig. 3 is a similar view of the same on the line 3 3 in Fig. 1.

The improved animal-trap is provided with a casing A, formed by a wire bent into spiral form, as is plainly indicated in Fig. 1, the forward end A' of the wire continuing in a rod $A^2$, extending rearwardly along the outside of the casing, at the bottom thereof, the rod being engaged by a loop $A^3$ formed at the rear end or termination of the wire casing A. The rod $A^2$ terminates at its rear end in a spring-coil $A^4$, arranged close to the rear end of the casing, so as to practically close the same, the spring-coil terminating in an arm $A^5$, extending forwardly over the top of said casing. The arm $A^5$ is adapted to be engaged by a trigger B, extending through the casing between adjacent convolutions of the spiral wire, the lower end of the trigger being formed into a loop B', loosely engaging the rod $A^2$. The upper end of the trigger B is provided with a hook $B^2$ for engaging the spring-arm $A^5$, so as to lock the same close to the top of the casing A.

The extreme forward end of the spring-arm $A^5$ is formed into an eye $A^6$, engaged by the upper end C' of a loop C, in alinement with the forward convolutions of the spiral wire forming the casing A, at the time the trigger B locks the arm $A^5$ in place, so that the animal can readily pass into the open end A' of the casing and through the loop C without much hindrance.

The bottom of the loop C is provided with upwardly-extending points $C^2$, adapted to engage the body of the animal at the time the arm $A^5$ swings upward and carries the loop C along.

The operation is as follows: In order to set the trap, the operator presses the spring-arm $A^5$ downward upon the top of the casing and then engages the hook $B^2$ of the trigger B with said arm to lock the latter in place against the tension of the spring-coil $A^4$. When the arm $A^5$ is swung downward, the loop C passes between the forward convolutions of the wire forming the casing, so that the latter is opened for the animal to enter. The trap is preferably placed in the burrow or hole forming the entrance to the animal's nest, and when the animal passes through the hole it finally enters the casing and comes in contact with the trigger B, which is thus with its hook $B^2$ pushed off the spring-arm $A^5$, and the latter is consequently released and by the force of the spring-coil $A^4$ swings upward and carries the loop C along. As the body of the animal still extends through the loop C, it is evident that the animal is immediately trapped by the bottom of the loop pressing the animal's body against the top of the forward end of the casing A, and thereby killing the animal almost instantly.

The improved animal-trap as described is very simple and durable in construction, can be cheaply manufactured, and is readily set and placed in proper position.

Having thus fully described my invention, I claim as new and desire to secure by Letters Patent—

1. An animal-trap provided with a casing formed of a single piece of wire, bent into spiral shape, a rod forming a continuation of the wire from the forward end of the casing, said rod extending rearwardly outside of the casing, a spring-loop in which terminates the rear end of said rod, an arm extending over the top of the casing, and forming a continuation of said spring-loop, a trigger held on said rod and adapted to engage said arm and extend through said casing, and a loop carried by the forward end of said arm and extending between the convolutions of the wire at the forward end of the casing, substantially as shown and described.

2. An animal-trap provided with a casing formed of a single piece of wire, bent into spiral shape, a rod forming a continuation of the wire from the forward end of the casing, a spring-loop in which terminates the rear end of the casing, said rod extending rearwardly outside of the casing, a spring-loop in which terminates the rear end of said rod, an arm extending over the top of the casing, and forming a continuation of said spring-loop, a trigger held on said rod and adapted to engage said arm and extend through said casing, and a loop carried by the forward end of said arm and extending between the convolutions of the wire at the forward end of the casing, said loop being provided at its bottom with pins, as set forth.

3. An animal-trap constructed of a length of wire coiled to form a casing and having one end resilient and extended longitudinally with the casing along the outer side thereof, a trigger attached to the casing and serving to hold said spring end of the wire in proximity to the casing, and a loop carried by the said spring end of the wire and projecting normally into the casing to impale the victim within the casing.

FRANK J. HEDA.

Witnesses:
WILLIAM H. D. LUDLOW,
P. V. R. DAFOE.